June 9, 1925.

Re. 16,095

R. STYLES

BURNER

Original Filed Oct. 1, 1923

P. J. Hickey

WITNESS:

Russell Styles,
INVENTOR

BY Victor J. Evans

ATTORNEY

Reissued June 9, 1925. Re. 16,095

UNITED STATES PATENT OFFICE.

RUSSELL STYLES, OF BROOKLYN, NEW YORK, ASSIGNOR TO STINSON SALES CO., INC., OF BROOKLYN, NEW YORK, A CORPORATION OF NEW YORK.

BURNER.

Original No. 1,495,120, dated May 20, 1924. Serial No. 665,984, filed October 1, 1923. Application for reissue filed December 24, 1924. Serial No. 757,938.

*To all whom it may concern:*

Be it known that I, RUSSELL STYLES, residing at Brooklyn, in the county of Kings and State of New York, and a citizen of the United States, have invented certain new and useful Improvements in Burners, of which the following is a specification.

This invention relates to burners and more particularly to burners for use in connection with gas heaters of the instantaneous type.

The principal object of the invention is to provide a burner which will be free from corrosion and which corrosion is now caused by the water of condensation.

Another object of the invention is the provision of a burner including a copper tube wherein a screen usually employed in burners of this type, is insulated and supported in spaced relation to the side walls of the tube for keeping the screen cool at all times whereby to eliminate back fire.

A still further object of the invention is to provide a burner with a burner head removable from the burner and so constructed as to prevent the water of condensation from flowing into the flame openings.

A still further object of the invention is to provide a burner wherein the number of parts is reduced to a minimum thereby rendering the same simple in construction, cheap of manufacture and highly efficient for the purpose intended.

With these and other objects in view, the invention resides in certain novel construction and combination and arrangement of parts, the essential features of which are hereinafter fully described, are particularly pointed out in the appended drawing, in which.

Figure 1:
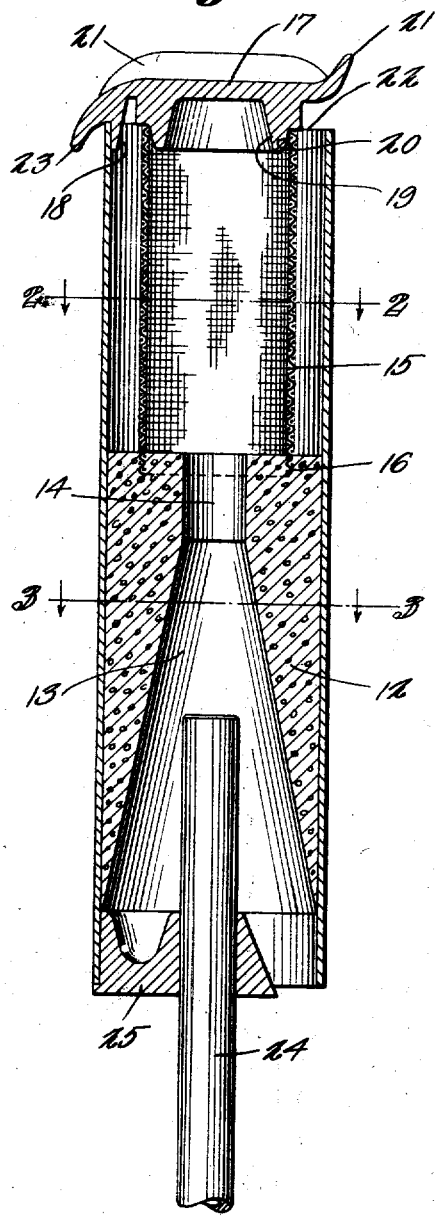
Figure 1 is a vertical longitudinal sectional view through my improved burner construction.
Figure 2:
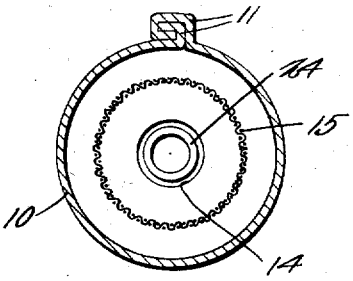
Figure 2 is a horizontal sectional view on the line 2—2 of Figure 1.
Figure 3:
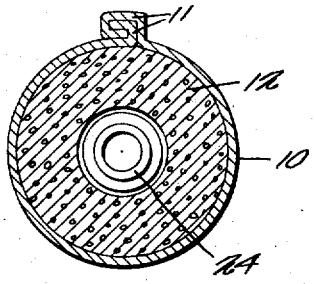
Figure 3 is a similar view on the line 3—3 of Figure 1.
Figure 4:
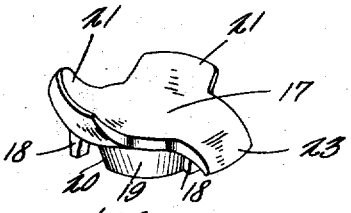
Figure 4 is a detail view of the burner head per se.

Referring more particularly to the drawing, the reference numeral 10 designates a copper tube which is formed from flat strip of material and the ends of which are provided with co-acting portions 11, 11 which form a seam after the strip has been formed into the tube 10.

I find that by using copper as a burner tube, the corrosion usually caused by the water of condensation is prevented thereby adding greatly to the life of the tube. This tube 10 is open at both ends and adjacent the lower end there is formed within the tube 10 a cement core 12, provided with a conical shaped bore 13 terminating in a restricted portion 14. This core 12 is formed by inserting a mold in the lower end of the tube and pouring the cement about the core and permitting it to dry. While the cement is in its softened condition, a suitable perforated cylinder or cylindrical screen 15 has its lower end anchored in the core 12 as at 16, whereby the same is supported in vertical axial alignment with the conical shaped bore 13. By supporting the screen 15 in this manner it will be seen that the same is spaced from the side walls of the tube 10 and also insulated therefrom which serves to keep the screen cooled at all times and prevent back fire.

By reason of the use of the core 12, the tube 10 may be of uniform diameter throughout its length, thereby enabling stock tubing to be employed and eliminating the necessity for shaping the tubing to provide the passages which are now formed in the core. Thus, by the use of my core characterized by a tapered, mixing passage for increasing the draft therethrough, I am enabled to use tubing of uniform diameter throughout its length, so that the burners may be manufactured and marketed at small cost, while at the same time the component parts are so arranged and co-related as to reduce the possibility of derangement to a minimum and enable the burner to operate at its maximum efficiency for a comparatively long time.

A burner head 17 is provided for partially closing the upper end of the tube and the same is formed with a plurality of depending lugs 18 which are adapted to frictionally engage the inner wall of the tube 10 for removably securing the burner head thereto. The burner head 17 is further provided with an annular flange 19, the exterior wall of which may be beveled as at 20 for co-action with the inner wall of the screen 15 whereby to also serve to retain the burner head in place and to hold the screen in vertical alignment with the axis of the tube. The burner head 17 is provided with a plurality of upturned lips 21 which co-act with one of the open ends of the tube 10 so as to provide flame openings 22 whereby to permit the fuel to flow and be ignited. The ends of the lips 21 terminate in a downwardly turned portion 23 which portion overhangs the walls of the tube so as to carry off the water of condensation thereby preventing the same from flowing into the flame opening 22.

The fuel supply pipe 24 enters the lower end of the tube 10 and is held in axial alignment therewith by means of a bracket 25, said pipe 24 extending part way into the mixing chamber which mixing chamber is defined by the bore 13.

In operation of the burner, the gas is introduced into the mixing chamber by means of the pipe 24 and air sucked in through the lower end of the tube by reason of the restricted portion of the bore, which portion sets up a vacuum for sucking the air. The principle is practically the same as that used in the Bunsen burner and the air and gas after being mixed in the chamber 13 passes up and out through the screen 15, the screen serving to break up the particles of mixture, after which the same is ignited at the flame openings 22. It will be seen that with a burner of this construction, same will be free from corrosion as the copper cylinder will not corrode by reason of the water of condensation and such water will be carried off in the manner previously described.

While I have described what I deem to be the most desirable embodiment of my invention, it is obvious that many of the details may be varied without in any way departing from the spirit of my invention and I therefore do not limit myself to the exact details of construction herein set forth nor to anything less than the whole of my invention limited only by the appended claims.

What is claimed as new, is:—

1. In a burner, the combination of a tube open at both ends, a core formed in said tube, a mixing chamber formed in said core, a foraminated cylinder insulated from the walls of said tube and supported by said core, and a burner head co-acting with the foraminated cylinder and one end of said tube for removably supporting the same.

2. In a burner, the combination of a tube open at both ends, a core formed in said tube, a mixing chamber formed in said core, a foraminated cylinder insulated from the walls of said tube and supported by said core, and a burner head co-acting with the foraminated cylinder and one end of said tube for removably supporting the same, and upturned lips formed on said burner head for co-action with the walls of said tube so as to define flame openings.

3. In a burner, the combination of a tube open at both ends, a core formed in said tube, a mixing chamber formed in said core, a foraminated cylinder insulated from the walls of said tube and supported by said core, and a burner head co-acting with the foraminated cylinder at one end of said tube for removably supporting the same, and upturned lips formed on said burner head for co-action with the walls of said tube so as to define flame openings, and a down turned portion formed on said burner head and extending beyond the walls of said tube to carry off the water of condensation.

4. A burner comprising a tubular member, a core formed in said tubular member and having a bore therein, a tubular screen having one end anchored to said core, and a burner head frictionally held at the other end of said tubular screen substantially as and for the purpose specified.

5. A burner comprising a tubular copper member, a cement core formed in said tubular member and having a bore therein, a tubular screen having one end anchored to said core, and a burner head frictionally held at the other end of said tubular screen substantially as and for the purpose specified.

6. A burner comprising a tube open at both ends, a cement core formed in said tube intermediate its ends and a conical bore formed in said core to define a mixing chamber, a cylindrical screen having one end anchored in said core to hold same in rigid position and in spaced relation to the walls of said tube, and a burner head co-acting with the other end of said screen and said tube.

7. A burner comprising a tube open at both ends, a cement core formed in said tube intermediate its ends and a conical bore formed in said core to define a mixing chamber, a cylindrical screen having one end anchored in said core to hold same in rigid position and in spaced relation to the walls of said tube, and a burner head co-acting with the other end of said screen and said tube, and a spider frictionally mounted in the other end of said tube for centering the fuel supply pipe in alignment with the axis of the conical shaped bore.

8. In a burner construction, the combination of a tube open at both ends, a refractory tubular core with open ends in said tube above and in line with the lower end thereof, a fuel supply pipe extending into the lower end of said tube and in the said tubular core, a tubular screen alined and communicating with the core and open at its upper end and a burner head at the upper end of said tube and screen.

9. A burner comprising a sheet of copper rolled into a tube, the meeting edges of which are interlocked, a cement core formed in said tube and provided with a mixing chamber, a tubular screen anchored in said core and spaced from the walls of said tube, and a burner head removably secured to one end of said tube and co-acting with the other end of said tubular screen whereby to hold the same in place thereon, and upturned lips provided on said burner head for defining the flame openings between said burner head and the end of said tube.

10. A burner comprising a tube open at both ends, a cylindrical screen, means for insulating said screen from the walls of said tube and for supporting the same in spaced relation thereto, said means including a cement core, a burner head having depending lugs for frictional engagement with the side walls of said tube and an annular flange for frictional engagement with one end of the tubular screen, and upturned lips formed on said burner head for co-action with one end of the tube for defining flame openings.

11. In a burner, a tube open at both ends, a core in said tube having a chamber formed therein, a cylinder co-axial with said core and spaced apart from the wall of said tube and perforated and a burner head at the outer end of said cylinder and the corresponding end of said tube.

12. In a burner, a tube open at both ends and of uniform diameter throughout its length, mixing means within said tube including a core and a perforated cylinder co-axial with said core and a burner head at one end of said tube.

13. In a burner, a tube open at both ends, a core in said tube adjacent to one end thereof having a chamber formed therein, a cylindrical screen in said tube contiguous to said core and adjacent to the other end of the tube and co-axial with the chamber in said core, and a burner head at the last mentioned end of said tube.

14. In a burner and in combination, a tube open at both ends and of uniform diameter throughout its length, a core with a tapered passage, in the tube, a perforated cylinder communicating at one end with the restricted end of the core passage and spaced from the tube wall, and a burner head at one end of the tube.

15. In a burner and in combination, a tube open at both ends and of uniform diameter throughout its length, a core with a tapered passage, in the tube, a perforated cylinder communicating at one end with the restricted end of the core passage and spaced from the tube wall, and a burner head at one end of the tube; the perforated cylinder being also of uniform diameter throughout its length.

In witness whereof I affix my signature.

RUSSELL STYLES.

Witnesses:

W. S. Stinson,

Anna Bednarik.